United States Patent
Driancourt

(10) Patent No.: US 10,825,252 B2
(45) Date of Patent: Nov. 3, 2020

(54) INFORMATION PROCESSING PROGRAM, METHOD, AND SYSTEM FOR SHARING VIRTUAL PROCESS FOR REAL OBJECT IN REAL WORLD USING AUGMENTED REALITY

(71) Applicant: KABUSHIKI KAISHA SQUARE ENIX, Tokyo (JP)

(72) Inventor: Remi Driancourt, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

(21) Appl. No.: 16/367,737

(22) Filed: Mar. 28, 2019

(65) Prior Publication Data
US 2019/0304196 A1    Oct. 3, 2019

(30) Foreign Application Priority Data
Mar. 30, 2018    (JP) .................................. 2018-068055

(51) Int. Cl.
*G06T 19/00* (2011.01)
*H04L 29/08* (2006.01)
(Continued)

(52) U.S. Cl.
CPC ............ *G06T 19/006* (2013.01); *G06F 3/011* (2013.01); *G06F 3/04815* (2013.01);
(Continued)

(58) Field of Classification Search
CPC ............................. G06T 19/006; H04L 67/18
See application file for complete search history.

(56) References Cited

U.S. PATENT DOCUMENTS

2015/0124106 A1* 5/2015 Tomita .................. G06F 16/58
348/207.1
2016/0054793 A1* 2/2016 Kasahara ................ G06T 5/50
345/633
(Continued)

FOREIGN PATENT DOCUMENTS

| EP | 2983139 | 2/2016 |
|---|---|---|
| JP | 2014-203175 | 10/2014 |

OTHER PUBLICATIONS

European Search Report from European Patent Office (EPO) in European Patent Appl. No. 19165855.8, dated Aug. 20, 2019.

*Primary Examiner* — Michael Le
(74) *Attorney, Agent, or Firm* — Greenblum & Bernstein, P.L.C.

(57) ABSTRACT

A server apparatus obtains positional information of a first terminal device and photographed image data on an image photographed by using the first terminal device. The server apparatus specifies a target object included in the photographed image data. The server apparatus obtains drawing information indicating content of a drawing process against the target object via the first terminal device. The server apparatus outputs superimposed information to the first terminal device or a second terminal device before a first user of the first terminal device or a second user of the second terminal device photographs the target object to which the content of the drawing process is attached, the superimposed information being used to cause the first terminal device or the second terminal device to superimpose the drawing information onto the target object included in the photographed image data and display the superimposed target object.

9 Claims, 5 Drawing Sheets

(51) Int. Cl.
*G06K 9/00* (2006.01)
*G06F 3/0481* (2013.01)
*G06F 3/01* (2006.01)

(52) U.S. Cl.
CPC .......... *G06K 9/00671* (2013.01); *H04L 67/18* (2013.01); *G06F 2203/04802* (2013.01)

(56) References Cited

U.S. PATENT DOCUMENTS

| | | | | |
|---|---|---|---|---|
| 2016/0189397 A1* | 6/2016 | Mullins | ..................... | G06T 7/90 |
| | | | | 345/633 |
| 2016/0371885 A1* | 12/2016 | Gavriliuc | ................ | G06F 3/017 |
| 2017/0069122 A1* | 3/2017 | Lee | ......................... | G06T 11/60 |
| 2018/0275749 A1* | 9/2018 | Yoon | ....................... | G06F 3/011 |
| 2019/0206129 A1* | 7/2019 | Khalid | ................... | A63F 13/88 |

* cited by examiner

INFORMATION PROCESSING PROGRAM, METHOD, AND SYSTEM FOR SHARING VIRTUAL PROCESS FOR REAL OBJECT IN REAL WORLD USING AUGMENTED REALITY

CROSS-REFERENCE TO RELATED APPLICATION

The present application relates to subject matter contained in Japanese Patent Application No. 2018-068055 filed on Mar. 30, 2018, the disclosure of which is expressly incorporated herein by reference in its entirety.

BACKGROUND OF THE INVENTION

1. Field of the Invention

At least one of embodiments of the present invention relates to a non-transitory computer-readable medium including an information processing program, an information processing method, and an information processing system that cause a plurality of users to share a virtual process for a real object, which is fixedly arranged in a real world, by using an augmented reality technology.

2. Description of the Related Art

In recent years, an augmented reality (AR) technology has started to be provided. Augmented reality is a technology for displaying a virtual object in a real space by superimposing a flat or stereoscopic onto an image in the real space and displaying the superimposed image.

Further, a technology for causing a plurality of users to share an object to be displayed by using the augmented reality technology has also been proposed. The technology for causing a plurality of users to share a virtual object is disclosed in JP2014-203175A (hereinafter, referred to as "Patent Document 1"), for example. Patent Document 1 discloses a technology for determining an appropriate position at which an object that a plurality of users desires to share can be easily viewed by all of these sharing users.

SUMMARY OF THE INVENTION

An information processing apparatus disclosed in Patent Document 1 is configured to arrange a virtual object at a position at which all of the plurality of users can easily view the virtual object. However, Patent Document 1 does not disclose a technology for causing a plurality of users to share a virtual process for a real object that is fixedly arranged in a real world.

It is an object of at least one of embodiments of the present invention to provide a non-transitory computer-readable medium including an information processing program, an information processing method, and an information processing system, each of which causes a plurality of users to share a virtual process for a real object that is fixedly arranged in a real world by using the augmented reality technology.

According to one non-limiting aspect of the present invention, there is provided a non-transitory computer-readable medium including an information processing program product for causing a server apparatus to realize functions to cause a display of at least one terminal device to display image data obtained by superimposing drawing information onto photographed image data.

The functions include a terminal positional information obtaining function configured to obtain positional information of a first terminal device.

The functions also include a photographed image data obtaining function configured to obtain photographed image data on an image photographed by using the first terminal device.

The functions also include a target object specifying function configured to specify a target object included in the photographed image data.

The functions also include a drawing information obtaining function configured to obtain drawing information, the drawing information indicating content of a drawing process against the target object that has been carried out by a first user of the first terminal device.

The functions also include a superimposed information outputting function configured to output superimposed information to the first terminal device or a second terminal device before the first user of the first terminal device or a second user of the second terminal device photographs the target object to which the content of the drawing process is attached, the superimposed information being used to cause the first terminal device or the second terminal device to superimpose the drawing information onto the target object included in the photographed image data and display the superimposed target object.

According to another non-limiting aspect of the present invention, there is provided an information processing method of causing a display of at least one terminal device to display image data obtained by superimposing drawing information onto photographed image data.

The information processing method includes a terminal positional information obtaining step of obtaining positional information of a first terminal device.

The information processing method also includes a photographed image data obtaining step of obtaining photographed image data on an image photographed by using the first terminal device.

The information processing method also includes a target object specifying step of specifying a target object included in the photographed image data.

The information processing method also includes a drawing information obtaining step of obtaining drawing information, the drawing information indicating content of a drawing process against the target object that has been carried out by a first user of the first terminal device.

The information processing method also includes a superimposed information outputting step of outputting superimposed information to the first terminal device or a second terminal device before the first user of the first terminal device or a second user of the second terminal device photographs the target object to which the content of the drawing process is attached, the superimposed information being used to cause the first terminal device or the second terminal device to superimpose the drawing information onto the target object included in the photographed image data and display the superimposed target object.

According to still another non-limiting aspect of the present invention, there is provided an information processing system for controlling functions to cause a display of at least one terminal device to display image data obtained by superimposing drawing information onto photographed image data, the information processing system comprising a communication network, a server apparatus, and the at least one terminal device.

The information processing system includes a terminal positional information obtaining unit configured to obtain positional information of a first terminal device.

The information processing system also includes a photographed image data obtaining unit configured to obtain photographed image data on an image photographed by using the first terminal device.

The information processing system also includes a target object specifying unit configured to specify a target object included in the photographed image data.

The information processing system also includes a drawing information obtaining unit configured to obtain drawing information, the drawing information indicating content of a drawing process against the target object that has been carried out by a first user of the first terminal device.

The information processing system also includes a superimposed information outputting unit configured to output superimposed information to the first terminal device or a second terminal device before the first user of the first terminal device or a second user of the second terminal device photographs the target object to which the content of the drawing process is attached, the superimposed information being used to cause the first terminal device or the second terminal device to superimpose the drawing information onto the target object included in the photographed image data and display the superimposed target object.

According to each of the embodiments of the present application, one or two or more shortages are solved.

BRIEF DESCRIPTION OF DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
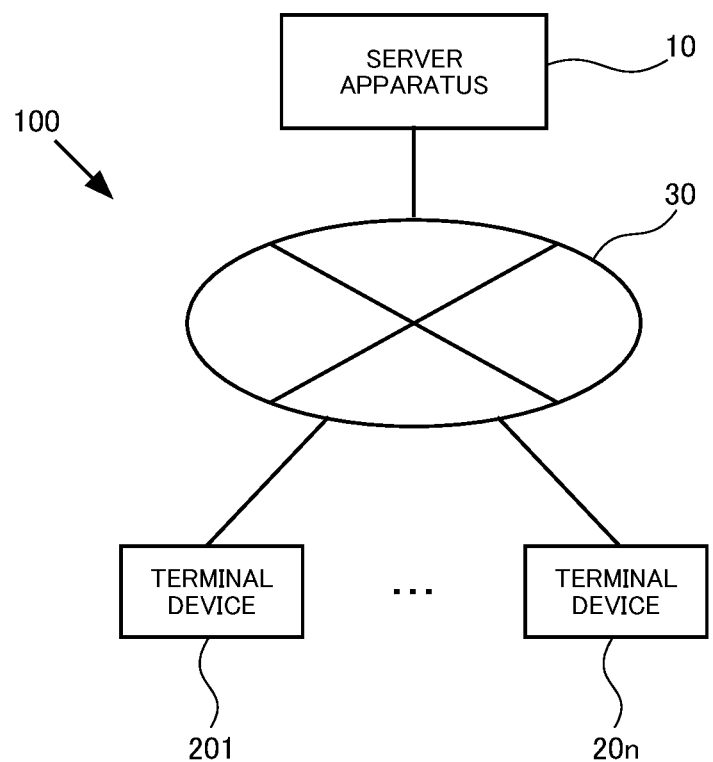
FIG. 1 is a block diagram illustrating an example of a configuration of an information processing system corresponding to at least one of the embodiments of the present invention.

FIG. 1 is a block diagram illustrating an example of a configuration of an information processing system 100 according to an embodiment of the present invention. As illustrated in FIG. 1, the information processing system 100 includes a server apparatus 10, and terminal devices 201 to 20$n$ ("n" is an arbitrary integer) that are used by a user of the information processing system 100. Note that the configuration of the information processing system 100 is not limited to this. The information processing system 100 may be configured so that a plurality of users uses a single terminal device. Alternatively, the information processing system 100 may be configured so that a plurality of server apparatuses is included in the information processing system 100.

Each of the server apparatus 10 and the plurality of terminal devices 201 to 20$n$ is connected to a communication network 30 such as the Internet. Although it is not illustrated in the drawings, the plurality of terminal devices 201 to 20$n$ is connected to the communication network 30, for example, by executing data communication with a base station that is managed by a communication provider via a wireless communication line.

The information processing system 100 includes the server apparatus 10 and the plurality of terminal devices 201 to 20$n$, whereby various functions to execute various types of processes in response to an operation of the user are realized.

The server apparatus 10 is managed by an administrator of the information processing system 100, and has various functions to provide information relating to various types of processes to the plurality of terminal devices 201 to 20$n$. In the present embodiment, the server apparatus 10 is configured by an information processing apparatus such as a WWW server apparatus, and includes a storage medium that stores various types of information therein. Note that the server apparatus 10 has a general configuration for executing various types of processes as a computer, such as a controller or a communication unit, but explanation thereof is omitted herein. Further, in the information processing system 100, from the viewpoint of a reduction in a processing load on each of the plurality of terminal devices 201 to 20$n$, it is preferable that the server apparatus 10 manages the various types of information. However, a storage that stores the various types of information therein may include a storage area that can be accessed by the server apparatus 10. For example, the information processing system 100 may be configured so that a dedicated storage area as the storage is provided outside the server apparatus 10.

Each of the plurality of terminal devices 201 to 20$n$ is managed by a user, and may be configured by a communication terminal such as a portable telephone terminal or a personal digital assistant (PDA), for example. It is necessary that a camera device by which the user photographs a moving image and/or a still image is mounted on each of the plurality of terminal devices 201 to 20$n$ and each of the plurality of terminal devices 201 to 20$n$ is provided with a display on which photographed image data or the like are displayed. As other examples of the configuration of the terminal device 201 to 20$n$, there are a so-called wearable device such as a smart watch, and a combination of the wearable device and the communication terminal or the like.

In addition, the camera device may be an optical camera or a device that is also used as a three-dimensional camera device. Further, each of the terminal devices 201 to 20*n* includes an input unit, such as a mouse, a touch panel, or a touch pen, which is used to input drawing information by the corresponding user.

In addition, each of the plurality of terminal devices 201 to 20*n* includes hardware and software to execute various types of processes by causing the corresponding terminal device 201 to 20*n* to be connected to the communication network 30 to communicate with the server apparatus 10. Each of the plurality of terminal devices 201 to 20*n* may be configured so as to be directly communicated with each other without the server apparatus 10. Hereinafter, the terminal devices 201 and 202 are also respectively referred to as a "first terminal device 201" and a "second terminal device 202".

In a process to execute information processing, the server apparatus 10 appropriately transmits the content of a processing process to each of the terminal devices 201 to 20*n*. Each of the terminal devices 201 to 20*n* displays screen content based on the received content of the processing process on a display screen of a display device. The screen content may be generated on the side of the server apparatus 10 or on a side of each of the terminal devices 201 to 20*n*.

Figure 2:
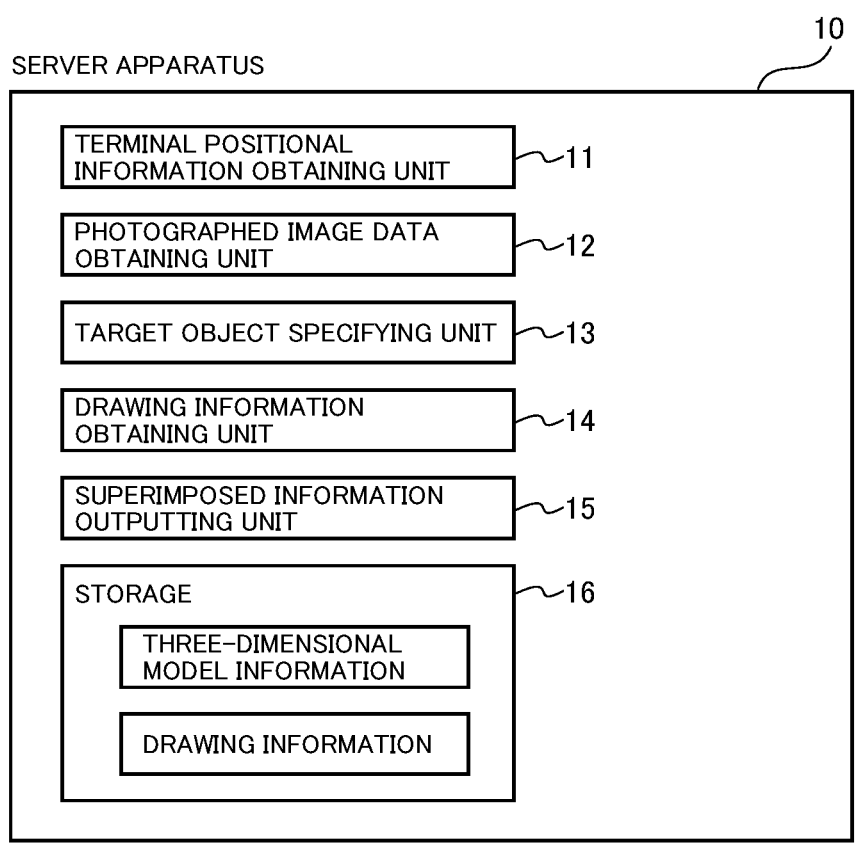
FIG. 2 is a block diagram illustrating a configuration of a server apparatus corresponding to at least one of the embodiments of the present invention.

FIG. 2 is a block diagram illustrating a configuration of the server apparatus 10. As illustrated in FIG. 2, the server apparatus 10 at least includes a terminal positional information obtaining unit 11, a photographed image data obtaining unit 12, a target object specifying unit 13, a drawing information obtaining unit 14, a superimposed information outputting unit 15, and a storage 16.

The terminal positional information obtaining unit 11 has a function to obtain positional information of the terminal device 201. The positional information may be obtained by any means. For example, the positional information may be obtained by using a GPS signal, or may be obtained on the basis of information relating to the reception intensities of radio signals from a plurality of beacon transmitters. The positional information obtained in the terminal device 201 is transmitted to the server apparatus 10, and is obtained by the terminal positional information obtaining unit 11. In addition, the positional information of the terminal device 201 may be obtained from a target object displayed in a video or an image that has been photographed by using the terminal device 201 or a special marker that is installed in advance in order to obtain the positional information. If the target object or the special marker is unique, it becomes possible to obtain the positional information of the terminal device 201 from a photographing angle or a distance of the target object or the special marker. In this case, the server apparatus 10 may obtain photographed image data that has been photographed by using the terminal device 201, and the server apparatus 10 may specify the positional information of the terminal device 201.

The photographed image data obtaining unit 12 has a function to obtain the photographed image data that has been photographed by using the terminal device 201. A user (first user) that desires to share an AR space carries out photographing by using a camera device included in the terminal device 201 of the user, and transmits the photographed image data to the server apparatus 10. The server apparatus 10 obtains the photographed image data from the terminal device 201. The photographed image data may be a still image or a moving image (animation). Moreover, in a case where the terminal device 201 includes an electronic compass function, the server apparatus 10 may also obtain information relating to a photographing direction. In addition, in a case where the terminal device 201 includes a function of a gyro sensor or the like, the server apparatus 10 may also obtain information relating to a photographing angle. By obtaining the information relating to the photographing direction and the information relating to the photographing angle together with the photographed image data, the target object specifying unit 13 described later can easily perform a target object specifying process.

The target object specifying unit 13 has a function to specify a target object included in the photographed image data. Here, the target object is referred to as an object for which a drawing process carried out by the user can be received. With respect to outdoor targets, a case where a building structure such as a building is set to be a single target object may be considered. With respect to indoor targets, a case where an element that exists in doors, such as a window, furniture, or a door, is set to be a single target object may be considered. Here, the server apparatus 10 causes the storage 16 to store therein in advance three-dimensional model information relating to a real space around each of the terminal devices 201 to 20*n*. The three-dimensional model information is, for example, a model constructed according to three-dimensional CAD or building information modeling (BIM). Namely, the target object specifying unit 13 specifies which object in the three-dimensional model information corresponds to the target object included in the photographed image data. The target object may be specified by using any method. For example, a method of applying image processing to the photographed image data to specify a target object included in an image may be considered. The target object may be specified by collating a feature part obtained as a result of the image processing with the three-dimensional model information. Moreover, in a case where the photographed image data obtaining unit 12 obtains the information relating to the photographing direction and/or the information relating to the photographing angle together with the photographed image data, candidates for the target object included in the photographed image data can be narrowed down by using the information relating to the photographing direction and the information relating to the photographing angle in addition to the positional information of the terminal device 201. In a case where targets that have been set as the target objects sparsely exist, there may be a possibility that the target object can be determined uniquely on the basis of the terminal positional information, the information relating to the photographing direction, and the information relating to the photographing angle. In a case where the target object specifying unit 13 specifies the target object, the server apparatus 10 notifies the terminal device 201, which has performed the photographing, of information relating to the specified target object. At this time, the server apparatus 10 transmits three-dimensional model information relating to the target object to be superimposed onto the photographed image data together with the information relating to the specified target object.

The drawing information obtaining unit 14 has a function to obtain drawing information indicating content of the drawing process that a user has carried out against the target object. Here, the drawing process carried out by the user is referred to as the whole processing in which a visual change in the appearance of an object is caused to be generated in the AR space. Examples of the drawing process include an act of coloring the target object, an act of drawing a picture on the target object, an act of pasting, onto the target object, an illustration, a stamp, or the like that has been generated and registered in advance, an act of, for example, pasting, installing, or arranging a virtual object onto the target object, and other acts. The user carries out the drawing process, as described above, for example, by operating an input device such as a mouse or a touch panel on a display of the terminal device 201 on which the photographed image data are displayed. It is necessary to grasp which portion in the three-dimensional model information relating to the target object the input content of the drawing process has been made against at this time indicates an input. The input content of the drawing process that has been made in this manner is referred to as drawing information. The drawing information also contains information indicating which portion in the three-dimensional model information an input has been made against. Specification of which portion in the three-dimensional model information the input of the drawing process has been made against may be a method that is carried out after the drawing information obtaining unit 14 of the server apparatus 10 obtains the drawing information. In this case, which portion in the three-dimensional model information an input has been made against is specified on the basis of a relationship between the photographed image data and an input position of the drawing information. The drawing information obtained in this manner is stored in the storage 16 so as to be associated with the three-dimensional model information.

The superimposed information outputting unit 15 has a function to output superimposed information to the terminal device 201 or 202 before the user (first user or second user) of the terminal device 201 or 202 photographs the target object to which the content of the drawing information is attached. The superimposed information is used to cause the terminal device 201 or 202 to superimpose the drawing information onto the target object included in the photographed image data and display the superimposed target object. A state where the target object is photographed from a direction of a current position of the terminal device 201 or 202 is displayed on the photographed image data on an image photographed by using the terminal device 201 or 202. It is necessary to output the drawing information displayed on the photographed image data at an angle of photographing to at least the terminal device 201 or 202. The drawing information to be outputted to the terminal device 201 or 202 at this time does not only contain the drawing information that has been drawn by the first user of the first terminal device 201, but also contains the drawing information that has been drawn by a second user of the second terminal device 202.

The storage 16 has a function to store therein various types of data used in processes of each of the units and data obtained as a result of the processes of each of the units. Specifically, three-dimensional model information relating to a real space is stored in advance in the storage 16. Further, the drawing information obtained by the drawing information obtaining unit 14 is also stored so as to be associated with the three-dimensional model information in the storage 16.

Figure 3:
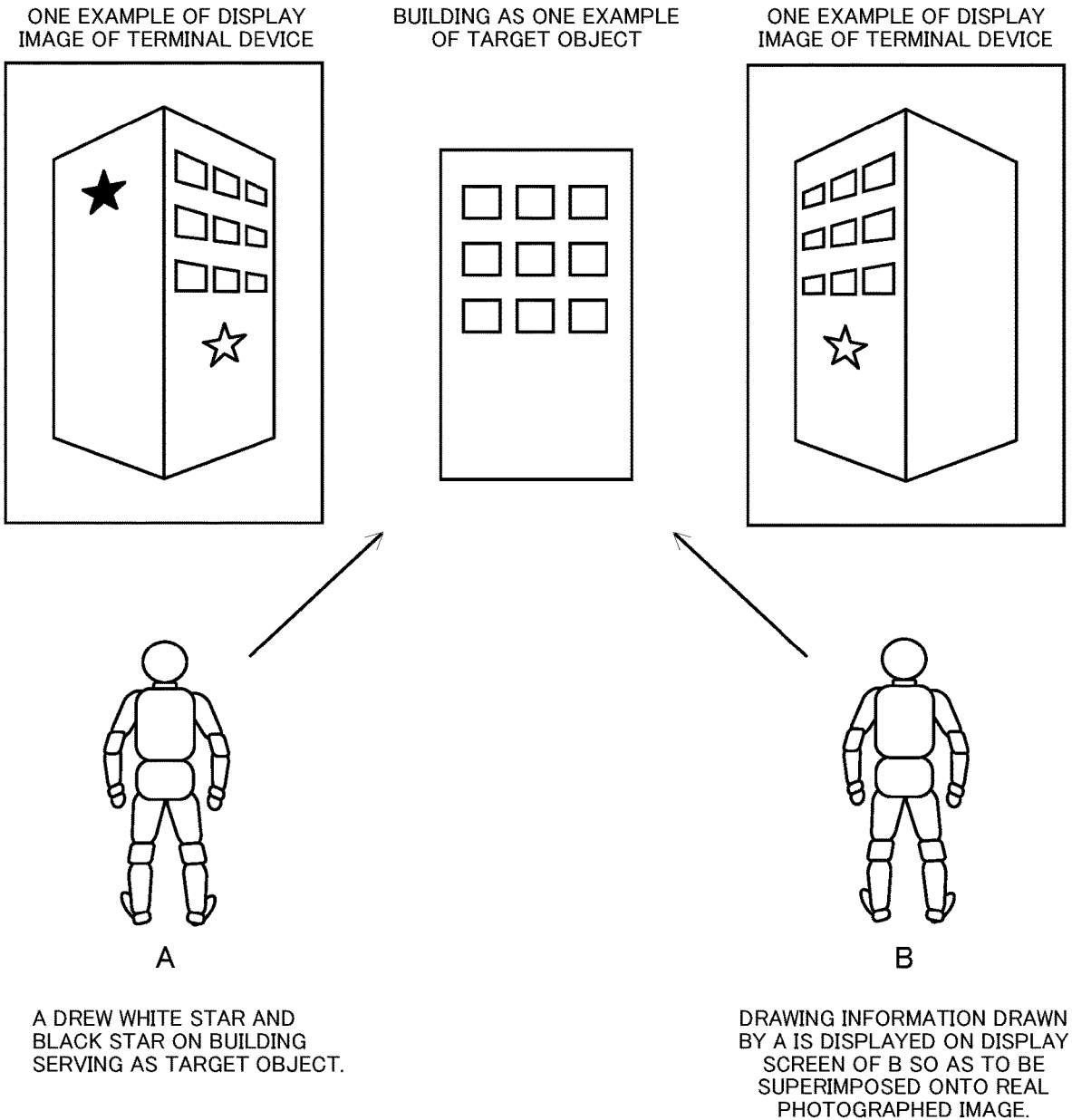
FIG. 3 is an explanatory diagram illustrating a concept of sharing of an AR space by a plurality of users by using the information processing system corresponding to at least one of the embodiments of the present invention.

FIG. 3 is an explanatory diagram illustrating a concept of sharing of an AR space by a plurality of users by using the information processing system 100 according to the present embodiment. In FIG. 3, a user A determines that a building serving as one example of the target object located in an obliquely right-forward direction thereof is a target to be shared in the information processing system 100. At this time, it is necessary that the user A first starts software for using the information processing system 100 according to the present embodiment on the terminal device 201. When the software is started, the terminal device 201 obtains positional information of the terminal device 201 on the basis of a positional information obtaining unit of the terminal device 201, and transmits the positional information of the terminal device 201 to the server apparatus 10. Next, when the user A photographs the building serving as one example of the target object located in the obliquely right-forward direction by using a camera device included in the terminal device 201 possessed by the user A to obtain photographed image data, the terminal device 201 transmits the photographed image data to the server apparatus 10. At this time, it is preferable that information relating to a photographing direction from a position of the terminal device 201 and information relating to a photographing angle are to be transmitted to the server apparatus 100 together with the photographed image data. The server apparatus 10 specifies a target object included in the photographed image data on the basis of various types of information containing the obtained photographed image data. At this time, the server apparatus 10 specifies which object in three-dimensional model information that has been generated and stored in advance corresponds to the target object. In a case where the target object is specified, the server apparatus 10 notifies the terminal device 201 that the building included in the photographed image data is the target object. The terminal device 201 that receives this notification receives a drawing process on the image of the photographed image data displayed on a touch-panel type display thereof by using a touch pen or the like, for example. Here, for example, the user A draws a white star on one side surface of the building having an approximately rectangular parallelepiped shape, and draws a black star on another side surface of the building. The terminal device 201 transmits these pieces of drawing information to the server apparatus 10, and the server apparatus 10 registers and stores these pieces of drawing information so as to be associated with the three-dimensional model information relating to the building.

Next, in FIG. 3, a user B determines that a building serving as one example of the target object located in an obliquely left-forward direction is a target to be shared in the information processing system 100. At this time, it is necessary that the user B first starts software for using the information processing system 100 according to the present embodiment in the terminal device 202. When the software is started, the terminal device 202 obtains positional information of the terminal device 202 on the basis of a positional information obtaining unit of the terminal device 202, and transmits the positional information of the terminal device 202 to the server apparatus 10. Next, when the user B photographs the building located in the obliquely left-forward direction (that is, the building on which the user A has carried out the drawing process) by using a camera device included in the terminal device 202 possessed by the user B to obtain photographed image data, the terminal device 202 transmits the photographed image data to the server apparatus 10. At this time, it is preferable that information relating to a photographing direction from a position of the terminal device 202 and information relating to a photographing angle are to be transmitted to the server apparatus 10 together with the photographed image data. The server apparatus 10 specifies a target object included in the photographed image data. In a case where the target object is specified, the server apparatus 10 notifies the terminal device 202 that the building included in the photographed image data is the target object. Then, in a case where drawing information has already been registered for the target object, the server 10 causes the terminal device 202 to superimpose the registered drawing information onto the photographed image data displayed on a display of the terminal device 202, and display the superimposed image. In the example of FIG. 3, the white star drawn on one side surface of the building is superimposed and displayed. However, the black star is drawn on another side surface is not displayed because the black star is drawn on the side of the building that the user B cannot view from the position of the terminal device 202. In a state where a superimposition display has been executed, the terminal device 202 receives a drawing process on the image of the photographed image data displayed on a touch-panel type display thereof by using a touch pen or the like, for example.

Figure 4:
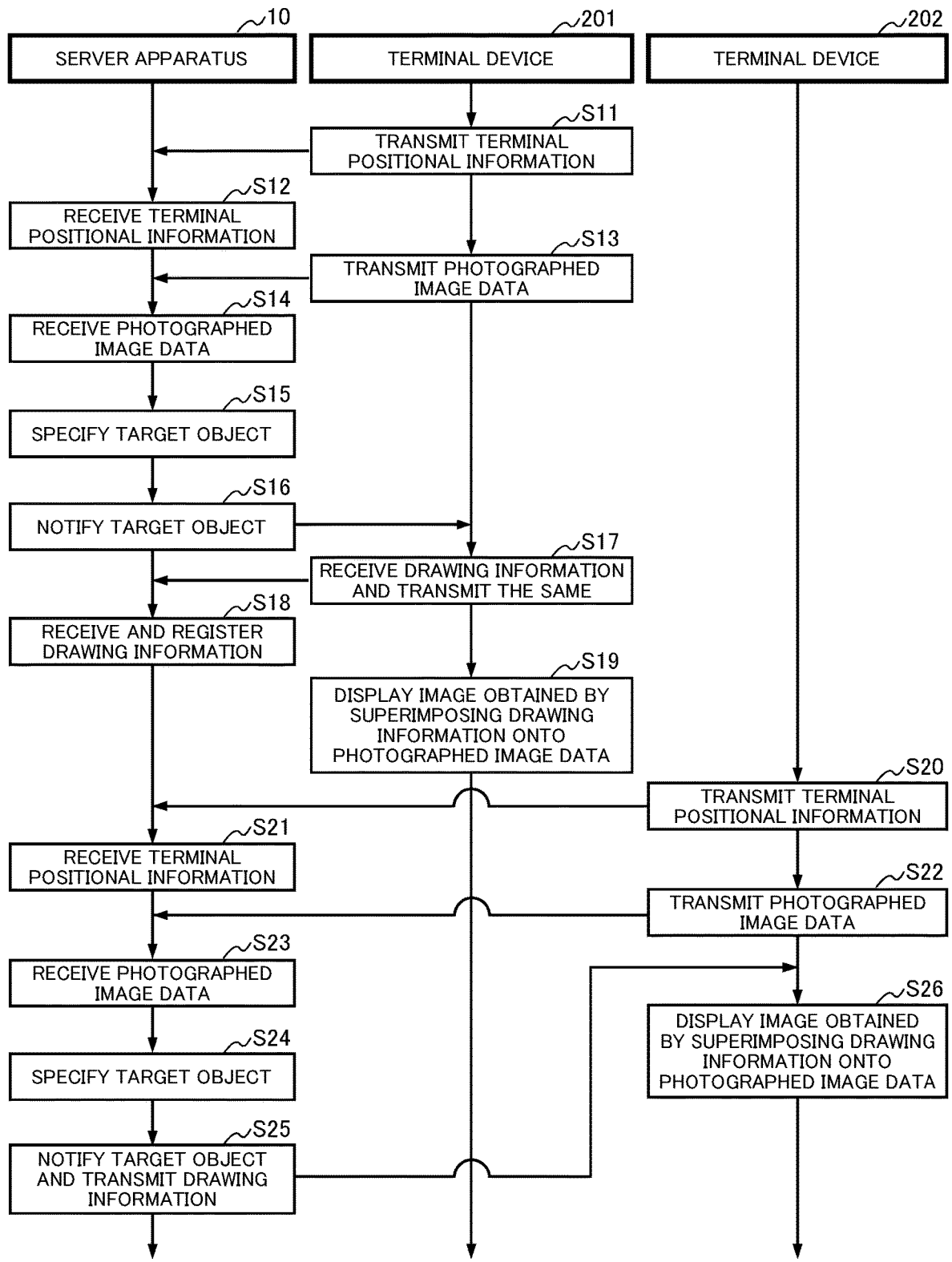
FIG. 4 is a flowchart illustrating an example of information processing corresponding to at least one of the embodiments of the present invention.

Next, a flow of the information processing executed in the information processing system 100 according to the present embodiment will be described. FIG. 4 is a flowchart illustrating an example of the information processing executed by the information processing system 100. Hereinafter, a case where the server apparatus 10, the terminal device 201, and the terminal device 202 execute the information processing will be described as an example.

As illustrated in FIG. 4, the terminal device 201 first transmits positional information of the terminal device 201 to the server apparatus 10, whereby the information processing is started (Step S11). For example, when the first user starts the software for using the information processing system 100 according to the present embodiment in the terminal device 201, the terminal device 201 obtains, as a trigger, the positional information, and transmits the positional information to the server apparatus 10. The server apparatus 10 receives the terminal positional information from the terminal device 201 (Step S12). Subsequently, when the first user carries out photographing by using the camera device included in the terminal device 201 to obtain photographed image data, the terminal device 201 transmits the photographed image data to the server apparatus 10 (Step S13). At this time, the terminal device 201 may also transmits information relating to a photographing direction from a position of the terminal device 201 and information relating to a photographing angle. The server apparatus 10 receives the photographed image data from the terminal device 201 (Step S14). The server apparatus 10 determines whether a target object exists in the received photographed image data. In a case where the target object exists, the server apparatus specifies the target object (Step S15). The target object is specified by specifying which object in three-dimensional model information corresponds to an object displayed in an image of the photographed image data. When the target object is specified, the server apparatus 10 notifies the terminal device 201 of the target object (Step S16). At this time, the server apparatus 10 may also transmits the three-dimensional model information relating to the target object to the terminal device 201. After the terminal device 201 receives the notification about the target object from the server apparatus 10, the terminal device 201 receives an input of a drawing process from the first user, and transmits drawing information to the server apparatus 10 (Step S17). At this time, the terminal device 201 may also be transmit information relating to which portion of the three-dimensional model information the input of the drawing process has been made against. The server apparatus 10 receives the drawing information from the terminal device 201, and registers the drawing information so as to be associated with the three-dimensional model information (Step S18). The terminal device 201 causes the display to display an image regarding image data obtained by superimposing the drawing information onto the photographed image data (Step S19).

Subsequently, when the second user starts the software for using the information processing system 100 according to the present embodiment in the terminal device 202 that is different from the terminal device 201, as a trigger, the terminal device 202 obtains positional information, and transmits the positional information to the server apparatus 10 (Step S20). The server apparatus 10 receives the terminal positional information from the terminal device 202 (Step S21). Subsequently, when the second user carries out photographing by using the camera device included in the terminal device 202 to obtain photographed image data, the terminal device 202 transmits the photographed image data to the server apparatus 10 (Step S22). At this time, the terminal device 202 may also transmits information relating to a photographing direction from a terminal position and information relating to a photographing angle. The server apparatus 10 receives the photographed image data from the terminal device 202 (Step S23). The server apparatus 10 determines whether a target object exists in the received photographed image data. In a case where the target object exists, the server apparatus specifies the target object (Step S24). The target object is specified by specifying which object in three-dimensional model information corresponds to an object displayed in an image of the photographed image data. When the target object is specified, the server apparatus 10 notifies the terminal device 202 of the target object. Further, in a case where drawing information has already been registered for the target object, the server apparatus 10 transmits the drawing information to the terminal device 202 (Step S25). At this time, the server apparatus 10 may also transmits three-dimensional model information relating to the target object to the terminal device 202. After the terminal device 202 receives the notification about the target object and the drawing information from the server apparatus 10, the terminal device 202 causes the display to display an image regarding image data obtained by superimposing the drawing information onto the photographed image data (Step S26). Then, the terminal device 202 may proceed to reception of an input of a drawing process from the second user. However, in FIG. 4, the processing is terminated at a point when the display of the terminal device 202 is caused to display the image data obtained by superimposing the drawing information onto the photographed image data.

Figure 5:
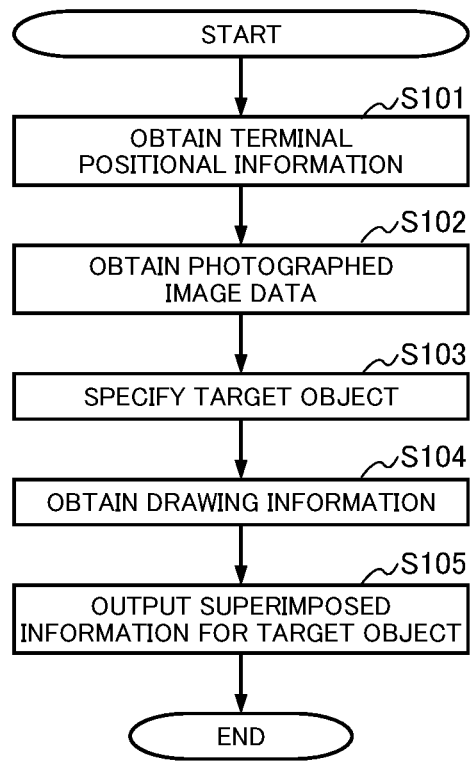
FIG. 5 is a flowchart illustrating an example of an operation on a side of the server apparatus in the information processing corresponding to at least one of the embodiments of the present invention.

FIG. 5 is a flowchart illustrating an example of an operation on the side of the server apparatus 10 in the information processing. Here, an operation of the server apparatus 10 in the information processing system 100 will be described. The server apparatus 10 executes the operation against the terminal device 201.

The server apparatus 10 receives positional information from the terminal device 201, whereby the information processing is started (Step S101). Subsequently, the server apparatus 10 obtains photographed image data on an image that has been photographed by a camera device included in the terminal device 201 (Step S102). At this time, the server apparatus 10 may also be obtains information relating to a photographing direction from a position of the terminal device 201 and information relating to a photographing angle. The server apparatus 10 determines whether a target object exists in the obtained photographed image data. In a case where the target object exists, the server apparatus 10 specifies the target object (Step S103). The target object is specified by specifying which object in three-dimensional model information corresponds to an object displayed in the image of the photographed image data. When the target object is specified, the server apparatus 10 notifies the terminal device 201 of the target object. The terminal device 201 then receives an input for a drawing process from the first user. In a case where drawing information has been registered so as to be associated with the specified target object, the server apparatus 10 also transmits the drawing information to the terminal device 201, and causes the terminal device 201 to superimpose the registered drawing information onto the photographed image data displayed on the display of the terminal device 201, and display the superimposed image. The server apparatus 10 obtains the drawing information received by the terminal device 201 from the terminal device 201, and registers the drawing information so as to be associated with the three-dimensional model information (Step S104). The server apparatus 10 outputs, as superimposed information, the drawing information to be displayed so as to be superimposed onto the photographed image data and displayed on the display of the terminal device 201 (Step S105), and terminates the information processing.

As described above, in the information processing system 100 according to the first embodiment, in order to cause a display of at least one terminal device 201 to 20n to display the image data obtained by superimposing drawing information onto photographed image data, the positional information of the first terminal device 201 is obtained; the photographed image data on an image photographed by using the first terminal device 201 is obtained; the target object included in the photographed image data is specified; the drawing information indicating the content of the drawing process that has been carried out on the target object by using the first user is obtained; and the superimposed information, which is used to cause the first terminal device 201 or the second terminal device 202 to superimpose the drawing information onto the target object included in the photographed image data and display the superimposed target object, is outputted to the terminal device 201 or the second terminal 202 before the first user of the terminal device 201 or the second user of the second terminal 202 photographs the target object to which the drawing information is attached. Therefore, it is possible for a plurality of users to share a virtual process such as the drawing process, which is carried out onto a real object that is fixedly arranged in a real world, by using the augmented reality technology.

In the first embodiment, the information processing in which the information processing system 100 causes the plurality of users to share the virtual process, such as the drawing process to the real object that is fixedly arranged in the real world, by using the augmented reality technology in the plurality of terminal devices 201 to 20n has been described. The information processing system 100 according to the first embodiment can also be applied to a video game.

For example, a video game may be considered in which: a predetermined area such as an area of one block in an outdoor alley or an area in a gymnasium is set to a field of the video game; a plurality of users are classified into a plurality of groups; a color is determined for each of the plurality of groups; each of the plurality of users carries out a drawing process for coloring a target object included in the predetermined range by using the color of the group to which the user belongs; colored areas are summed up for each of the plurality of groups at a point when a termination condition such as a predetermined time period is satisfied; and it is determined that a group for which the sum of the colored areas is the largest is a winner. By executing control to cause the video game described above to proceed while the plurality of users is sharing the drawing process carried out by each of the plurality of users in an AR space, such a video game can be realized in which a plurality of users shares a drawing process, such as coloring, which is executed against a real object that is fixedly arranged in a real world by using the augmented reality technology.

Further, as one example of another video game, a video game may be considered in which a plurality of users draws a picture on a real object such as a wall surface of a building in cooperation with each other. In this case, pallets to which different colors are respectively set may be assigned to the plurality of users, or a brush having a different diameter may be assigned to each of the plurality of users. The video game has a goal that a picture is completed by the plurality of users respectively having different conditions. The completed picture may be presented in an AR space during a predetermined period, and evaluations of the completed picture may be obtained from the plurality of users.

Moreover, as one example of still another video game, by realizing a function to cause a user to arrange an item in an AR space and a function to obtain an item from the AR space as a method of the drawing process by using the information processing system 100 according to the present embodiment, for example, a plurality of users can exchange items, lay a trap, or exchange information via the AR space. This makes it possible to provide a fun factor or a playability to the video game.

As described above, according to the first embodiment of the present application, one or two or more shortages are solved. Note that the effects of the first embodiment are not restrictive and are one example of the effects.

What is claimed is:

1. A non-transitory computer-readable medium including an information processing program product for causing a server apparatus to realize functions to cause a display of at least one terminal device to display image data, the image data being obtained by superimposing drawing information onto photographed image data, the functions comprising:

a terminal positional information obtaining function configured to obtain positional information of a first terminal device;

a photographed image data obtaining function configured to obtain photographed image data on an image photographed by using the first terminal device;

a target object specifying function configured to specify, to the first terminal device, a target object included in the photographed image data, the target object included in the photographed image data being specified by the server apparatus;

a drawing information obtaining function configured to obtain drawing information, the drawing information indicating content of a first drawing process against the target object, the first drawing process having been carried out by a first user of the first terminal device; and a superimposed information outputting function configured to output superimposed information to the first terminal device or a second terminal device before the first user of the first terminal device or a second user of the second terminal device photographs the target object to which the content of the first drawing process is attached, the superimposed information being used to cause the first terminal device or the second terminal device to superimpose the drawing information onto the target object included in the photographed image data and display a superimposed target object, wherein the server apparatus, in addition to specifying the target object in the photographed image data to the first terminal device, determines a first color to be used by the first user of the first terminal device in the first drawing process, the server apparatus is further configured to specify, to the second terminal device, the target object in the photographed image data and to determine a second color to be used by the second user of the second terminal device in a second drawing process against the target object, the second color being different than the first color, and colored areas of the target object in the first color and the second color are summed up for the first terminal device and the second terminal device when a termination condition is satisfied.

2. The non-transitory computer-readable medium according to claim 1, wherein the server apparatus comprises a storage in which three-dimensional model information is stored in advance, the three-dimensional model information relating to a real space at least around the first terminal device, the target object specifying function is further configured to specify which object in the three-dimensional model information is to be the target object included in the photographed image data, and the drawing information obtaining function is further configured to obtain, when the drawing information is obtained, information relating to where the drawing process has been performed in the three-dimensional model information corresponding to the target object together with the drawing information.

3. The non-transitory computer-readable medium according to claim 2, wherein the superimposed information outputting function is further configured to output, as the superimposed information, predetermined drawing information included in a photographable range of the second terminal device among plural pieces of drawing information relating to the target object, which are stored in the storage of the server apparatus, in accordance with a positional relationship between the terminal positional information obtained for the second terminal device and the target object.

4. The non-transitory computer-readable medium according to claim 1, wherein the first terminal device includes a plurality of first terminal devices and the second terminal device includes a plurality of second terminal devices.

5. The non-transitory computer-readable medium according to claim 4, wherein the target object includes a wall surface in the image photographed by using the first terminal device.

6. The non-transitory computer-readable medium according to claim 5, wherein the wall surface includes an area of an outdoor alley or an area in a gymnasium.

7. The non-transitory computer-readable medium according to claim 4, wherein the information processing program product includes a goal in which the first drawing process and the second drawing process against the target object are completed by a plurality of users respectively having different conditions.

8. An information processing method of causing a display of at least one terminal device to display image data, the image data being obtained by superimposing drawing information onto photographed image data, the information processing method comprising:

obtaining positional information of a first terminal device;

obtaining photographed image data on an image photographed by using the first terminal device;

specifying, to the first terminal device, a target object included in the photographed image data, the target object included in the photographed image data being specified by a server apparatus;

determining a first color to be used by a first user of the first terminal device in a first drawing process against the target object, the first color being determined by the server apparatus;

obtaining drawing information, the drawing information indicating content of the first drawing process against the target object, the drawing process having been carried out by the first user of the first terminal device;

outputting superimposed information to the first terminal device or a second terminal device before the first user of the first terminal device or a second user of the second terminal device photographs the target object to which the content of the drawing process is attached, the superimposed information being used to cause the first terminal device or the second terminal device to superimpose the drawing information onto the target object included in the photographed image data and display a superimposed target object;

specifying, to the second terminal device, the target object included in the photographed image data;

determining a second color to be used by the second user of the second terminal device in a second drawing process against the target object, the second color being different than the first color; and summing colored areas of the target object in the first color and the second color for the first terminal device and the second terminal device when a termination condition is satisfied.

9. An information processing system for controlling a display of at least one terminal device to display image data, the image data being obtained by superimposing drawing information onto photographed image data, the information processing system comprising:

a server apparatus; and the at least one terminal device, the at least one terminal device being connected to the server apparatus via a communication network, wherein at least one of the server apparatus or the at least one terminal device is configured to:

obtain positional information of a first terminal device;

obtain photographed image data on an image photographed by using the first terminal device;

specify, to the first terminal device, a target object included in the photographed image data, the target object included in the photographed image data being specified by the server apparatus;

determine a first color to be used by a first user of the first terminal device in a first drawing process against the target object, the first color being determined by the server apparatus;

obtain drawing information, the drawing information indicating content of the first drawing process against the target object, the drawing process having been carried out by the first user of the first terminal device;

output superimposed information to the first terminal device or a second terminal device before the first user of the first terminal device or a second user of the second terminal device photographs the target object to which the content of the drawing process is attached, the superimposed information being used to cause the first terminal device or the second terminal device to superimpose the drawing information onto the target object included in the photographed image data and display a superimposed target object;

specify, to the second terminal device, the target object included in the photographed image data;

determine a second color to be used by the second user of the second terminal device in a second drawing process against the target object, the second color being different than the first color; and summing colored areas of the target object in the first color and the second color for the first terminal device and the second terminal device when a termination condition is satisfied.

* * * * *